US009328826B2

(12) United States Patent
Hayashi

(10) Patent No.: US 9,328,826 B2
(45) Date of Patent: May 3, 2016

(54) FLUID CONTROL VALVE AND MASS FLOW CONTROLLER

(71) Applicant: HORIBA STEC, Co., Ltd., Kyoto-shi, Kyoto (JP)

(72) Inventor: Shigeyuki Hayashi, Kyoto (JP)

(73) Assignee: HORIBA STEC, CO. Ltd., Kyoto-shi (JP)

(*) Notice: Subject to any disclaimer, the term of this patent is extended or adjusted under 35 U.S.C. 154(b) by 54 days.

(21) Appl. No.: 14/141,371

(22) Filed: Dec. 26, 2013

(65) Prior Publication Data

US 2014/0190578 A1 Jul. 10, 2014

(30) Foreign Application Priority Data

Jan. 7, 2013 (JP) .................................. 2013-000749

(51) Int. Cl.
| F16K 31/02 | (2006.01) |
| F16K 15/10 | (2006.01) |
| F16K 1/42  | (2006.01) |
| F16K 31/00 | (2006.01) |
| G05D 7/06  | (2006.01) |

(52) U.S. Cl.
CPC ................. *F16K 1/42* (2013.01); *F16K 31/007* (2013.01); *G05D 7/0635* (2013.01); *Y10T 137/7759* (2015.04)

(58) Field of Classification Search
CPC ........... F16K 1/42; F16K 1/54; F16K 31/007; G05D 7/0635; G05D 7/0629; Y10T 137/7759; Y10T 29/49412; Y10T 29/5152; Y10T 29/5165; Y10T 29/519; Y10T 279/32; Y10T 279/1041; Y10T 403/7024; Y10T 403/7051

USPC ................ 137/486, 487.5; 251/333, 366, 157
See application file for complete search history.

(56) References Cited

U.S. PATENT DOCUMENTS

| 3,245,429 | A  | * | 4/1966  | Bacino et al. ............. 137/543.21 |
| 3,623,699 | A  | * | 11/1971 | Matousek et al. ............ 251/330    |
| 3,814,121 | A  | * | 6/1974  | Lawson .................... 137/329.03  |
| 5,094,430 | A  | * | 3/1992  | Shirai et al. ............... 251/129.06 |
| 5,582,208 | A  | * | 12/1996 | Suzuki ..................... 137/625.33  |
| 6,089,262 | A  | * | 7/2000  | Hart ........................ 137/543.21  |
| 7,387,135 | B2 | * | 6/2008  | Anastas .................... 137/487.5   |
| 7,748,962 | B2 | * | 7/2010  | Haeberle et al. .............. 417/412  |
| 8,100,382 | B2 | * | 1/2012  | Robertson et al. ........ 251/129.17    |
| 8,221,100 | B2 | * | 7/2012  | Forrest et al. ................. 417/567 |
| 8,844,901 | B2 | * | 9/2014  | Hayashi ........................ 251/123 |
| 8,910,656 | B2 | * | 12/2014 | Yasuda ......................... 137/486 |
| 8,967,200 | B2 | * | 3/2015  | Hayashi ..................... 137/625.3  |

(Continued)

FOREIGN PATENT DOCUMENTS

JP 2010230159 A 10/2010

*Primary Examiner* — Craig Schneider
*Assistant Examiner* — Minh Le
(74) *Attorney, Agent, or Firm* — Alleman Hall McCoy Russell & Tuttle LLP

(57) ABSTRACT

In order to, in a short period of time, reduce to zero a measured flow rate value measured after fully closing a fluid control valve, the fluid control valve having a configuration suitable to decrease the inside volume of the fluid control valve is configured together with a valve element member, and a valve seat block provided with: an in-valve flow path that is formed inside of the valve seat block; and a valve seat surface that is brought into contact with or separated from a seating surface of the valve element member is provided with a cutout that is formed in a part of a protruded rim so as to be communicatively connected to a downstream side flow path.

11 Claims, 9 Drawing Sheets

(56) References Cited

U.S. PATENT DOCUMENTS

| | | | |
|---|---|---|---|
| 2004/0238040 A1* | 12/2004 | Furukawa | 137/487.5 |
| 2008/0257430 A1* | 10/2008 | Best | 137/596.2 |
| 2009/0255591 A1* | 10/2009 | Grout et al. | 137/334 |
| 2010/0229967 A1* | 9/2010 | Yasuda et al. | 137/486 |
| 2013/0048898 A1* | 2/2013 | Hayashi | 251/337 |
| 2014/0069527 A1* | 3/2014 | Mudd et al. | 137/487 |
| 2014/0076424 A1* | 3/2014 | Takijiri | 137/486 |
| 2014/0083159 A1* | 3/2014 | Nagai | 73/1.34 |
| 2014/0116538 A1* | 5/2014 | Tanaka et al. | 137/486 |

* cited by examiner

FLUID CONTROL VALVE AND MASS FLOW CONTROLLER

TECHNICAL FIELD

The present invention relates to a fluid control valve that is a valve used for, for example, a mass flow controller for controlling a flow rate of gas, or the like, and configured to include a valve seat block and a valve element member.

BACKGROUND ART

A fluid control valve is one that intervenes between an upstream side flow path and a downstream side flow path, to control a flow rate or pressure of fluid flowing through the flow paths, or to fully close to prevent the fluid from flowing between the respective flow paths.

For example, a thermal type mass flow controller that is, sequentially from an upstream side, provided with a thermal type flow rate sensor and such a fluid control valve is used for a semiconductor manufacturing process.

In recent years, the semiconductor manufacturing process has required flow rate control performance having higher accuracy than before, and therefore the thermal type mass flow controller has been sometimes replaced by a pressure type mass flow controller that is provided with a pressure type flow rate sensor having higher measurement accuracy and responsiveness than the thermal type flow rate sensor.

Meanwhile, as described in Patent literature 1 and illustrated in FIG. 8(a), there is one pressure type mass flow controller 100A that is, sequentially from an upstream side, provided with a fluid control valve V, and a first pressure sensor P1, fluid resistor L, and second pressure sensor P2 that constitute a pressure type flow rate sensor FS.

In the case of replacing the above-described thermal type mass flow controller in which the fluid control valve is present on a downstream side of the flow rate sensor by such a pressure type mass flow controller 100A in which the fluid control valve V is provided on the upstream side of the pressure type flow rate sensor FS, a difference in mode of outputting a measured flow rate value from the flow rate sensor FS in the case of bringing the fluid control valve V to a fully closed state may become a problem.

That is, in the case of the above-described configuration of the thermal type mass flow controller, when the fluid control valve is fully closed, a measured flow rate value is substantially simultaneously outputted as zero, whereas in the case of the pressure type mass flow controller 100A having the configuration as illustrated in FIG. 8(a), even when the fluid control valve V is fully closed, a measured flow rate value decreases over a predetermined time and asymptotically approaches zero. In the case where there is a difference in behavior of a measured flow rate value after the fluid control valve V has been fully closed, in the semiconductor manufacturing process that uses a measured flow rate value as a trigger to set up various types of sequences, it is necessary to redo threshold settings and the like, and perform other work, and therefore in some cases, it is not easy to replace a mass flow controller.

The reason why as described, in the mass flow controller 100A having the configuration as illustrated in FIG. 8(a), a phenomenon appears in which even in the case of fully closing the fluid control valve V, the measured flow rate value does not instantaneously reach zero, is because the fluid remaining in the volume from the fluid control valve V to the fluid resistor L at the time of fully closing the fluid control valve V flows toward the downstream side.

Accordingly, by making the volume from the fluid control valve V to the fluid resistor L as small as possible, even in the above-described pressure type mass flow controller 100A, a time necessary for the measured flow rate value to decrease to zero or a value near zero after the fluid control valve V has been fully closed can be shortened, and therefore the pressure type mass flow controller 100A can be made to exhibit substantially the same behavior as that after the fluid control valve of the thermal type mass flow controller has been fully closed.

However, regarding the above-described volume, in particular, it is difficult to miniaturize the fluid control valve V to reduce the volume of the fluid control valve V.

More specifically, as illustrated in FIG. 8(b), the fluid control valve V is that is provided with: a valve seat block 5A; a valve element member 6A; an actuator 3A provided with a piezo stack 31A that drives the valve element member 6A; and a coil spring SP for, in a state where voltage is not applied, restoring the piezo stack 31A to an upper initial position. Also, the valve seat block 5A is, as illustrated in FIG. 9, formed in a substantially cylindrical shape, and provided with: a first in-valve flow path 51a that opens in a bottom surface part 52A and in an upper surface part 53A, and is formed inside of the valve seat block 5A so as to be communicatively connected to an upstream side flow path; an L-shaped second in-valve flow path 51b that opens in the upper surface part 53A and on a bottom part side of an outer circumferential surface 59A, and formed inside of the valve seat block 5A so as to be communicatively connected to a downstream side flow path 23; and an annular-shaped protruded rim 54A that is, in the upper surface part 53A, protruded so as to surround an outflow opening of the first in-valve flow path 51a and an inflow opening of the second in-valve flow path 51b without space, and in an upper part, provided with a pressed surface 55A that is pressed toward the bottom surface 52A side at the time of assembling. As can be seen from two-dotted lines with arrows in FIGS. 8(b) and 9, the fluid flowing from the upstream side flow path 22 flows in the order of the first in-valve flow path 51a, an inner side part of the protruded rim 54A in the upper surface part 53A, the second in-valve flow path 51b, a space between the outer circumferential surface and a body of the mass flow controller, and the downstream side flow path 23.

In the case of attempting to miniaturize the valve seat block 5A having such structure while keeping the same shape, and thereby reduce inside volume, in terms of space, it is difficult to form both of the first in-valve flow path 51a and the second in-valve flow path 51b inside. Also, even in the case of being able to form both of the in-valve flow paths while miniaturizing the valve seat block 5A, under the presence of the two in-valve flow paths, the inside volume cannot be reduced so much, and consequently, it is difficult to, in a short period of time, decrease to zero the measured flow rate value measured by the pressure type mass flow controller 100A after the full closing.

CITATION LIST

Patent Literature

Patent Literature 1: JP-A2010-230159

SUMMARY OF INVENTION

Technical Problem

The present invention is made in consideration of the problem as described above, and intended to provide a fluid control valve of which a valve seat block has a configuration suitable to reduce inside volume, and a mass flow controller that uses the fluid control valve to, in a short period of time, decrease to zero a measured flow rate value measured after the fluid control valve has been fully closed.

Solution to Problem

The fluid control valve of the present invention is a fluid control valve configured to include a valve seat block and a valve element member, the valve seat block being provided with: an in-valve flow path that is formed inside of the valve seat block; and a valve seat surface that is brought into contact with or separated from a seating surface of the valve element member, wherein the valve seat block is further provided with: one end surface part that is at an upstream end of the in-valve flow path and formed with an inflow opening connected to an upstream side flow path; the other end surface part that is at a downstream end of the in-valve flow path and formed with an outflow opening through which fluid flowing in from the inflow opening flows outside the valve seat block; a protruded rim that is formed by being protruded by a predetermined height so as to surround the outflow opening in the other end surface part, and provided with a pressed surface that is pressed toward a one end surface part side during assembly; and a cutout that is formed in a part of the protruded rim so as to be communicatively connected to a downstream side flow path.

If so, the cutout is formed in the part of the protruded rim, and therefore the fluid having flowed from the upstream side flow path into the in-valve flow path can flow from the outflow opening to the downstream side flow path through the cutout.

Accordingly by only forming the single in-valve flow path inside the valve seat block, the fluid control valve can be configured between the upstream side flow path and the downstream side flow path together with the valve element member, so that it is necessary to form only one internal flow path, and therefore the valve seat block itself can be easily miniaturized to easily reduce the inside volume of the fluid control valve.

On the basis of this, in the case of using the fluid control valve of the present invention for a mass flow controller, the volume from the valve element member to the opening to the downstream side flow path in the fluid control valve can be made small, and therefore for example, the volume from the fluid control valve arranged on an upstream side to a flow rate sensor on a downstream side of the fluid control valve can also be made small. For this reason, an amount of the fluid that is accumulated between the fluid control valve and the flow rate sensor at the time of full closing can be made small, and therefore a measured flow rate value that is measured by the flow rate sensor after the fluid control valve has been fully closed can be made to approach zero in a short period of time. That is, the fluid control valve of the present invention enables characteristics of a measured flow rate value after the full closing to be made substantially the same as those of an existing mass flow controller used in a semiconductor manufacturing process, and therefore replacement is facilitated.

Even in the case of forming a plurality of cutouts, the fluid having passed through the cutouts once can be gathered and then flowed to the downstream side flow path, and in order to make it easy to ensure a predetermined amount of the fluid that can be flowed through the fluid control valve, it is only necessary that the fluid control valve is configured such that the fluid having flowed out from the outflow opening passes through the cutouts, moves along an outer circumferential surface of the valve seat block, and flows to the downstream side flow path.

In order to symmetrize deformation of the valve seat block caused by a force applied from the pressed surface during assembly, and maintain flatness of the valve seat surface that is brought into contact with the seating surface of the valve element member, it is only necessary that the protruded rim is formed in a substantially annular shape; and three cutouts are formed in a circumferential direction at regular intervals.

As a shape that is, in the case where the downstream side flow path is on the one end surface part side of the valve seat block in an assembled state, suitable to flow the fluid having passed through the cutout to the one end surface part side then moving the fluid along the outer circumferential surface, it is only necessary that the outer circumferential surface is formed as a side surface of a substantially two-step cylindrical shape of which a major diameter is on the other end surface part side and a minor diameter is on the one end surface part side; and on the other end surface part side of the outer circumferential surface, a cutoff part is formed by cutting off the vicinity of the cutout in an axial direction.

Configurations suitable to configure a normal close type fluid control valve in which in a state where the valve element member is in an initial position, the seating surface and the valve seat surface are in contact with each other include a configuration in which in the one end surface part, the valve seat surface is formed so as to surround the inflow opening.

In order to be able to prevent the valve seat surface formed in the one end surface part from being deformed during assembly by a pressing force from the pressed surface formed in the other end surface part, and thereby maintain flatness of the valve seat surface in the assembled state, it is only necessary that in the one end surface part, an annular concave groove, which has a smaller outside diameter size than an outside diameter size of the protruded rim, is formed so as to surround the inflow opening. If so, the deformation by the pressing force from the pressed surface substantially occurs in an outer part of the concave groove, so that on an inner side of the concave groove in the one end surface part, the deformation hardly occurs, and therefore the flatness of the valve seat surface can be maintained.

Configurations suitable to configure a normal open type fluid control valve in which in a state where the valve element member is in an initial position, the seating surface and the valve seat surface are separate from each other include a configuration in which in the other end surface part, the valve seat surface is formed on an inner side of the protruded rim that surrounds the outflow opening and the valve seat surface is protruded to a lower level than a level of the pressed surface.

In order to provide a configuration that is suitable to miniaturize the fluid control valve, and adapted such that the fluid from the upstream side flow path passes through the cutout from the outer circumferential surface of the valve seat block, flows into the inflow opening of the in-valve flow path, and then flows out from the outflow opening to the downstream side flow path, it is only necessary that the fluid control valve is a fluid control valve configured to include a valve seat block and a valve element member, the valve seat block being provided with: an in-valve flow path that is formed inside of the valve seat block; and a valve seat surface that is brought into contact with or separated from a seating surface of the valve element member, wherein the valve seat block is further provided with: a one end surface part that is at a downstream end of the in-valve flow path and formed with an outflow opening connected to a downstream side flow path; the other end surface part that is at an upstream end of the in-valve flow path and formed with an inflow opening through which fluid flows in from outside the valve seat block; a protruded rim that is protruded by a predetermined height so as to surround the inflow opening in the other end surface part, and provided with a pressed surface that is pressed toward a one end surface part side during assembly; and a cutout that is formed in a part of the protruded rim so as to be communicatively connected to an upstream side flow path.

A mass flow controller is provided with: the fluid control valve of the present invention; and a flow rate sensor that is provided on a downstream side of the fluid control valve enables the volume from the fluid control valve to the flow rate sensor to be made very small, and a value of a measured flow rate value to be decreased to zero or a value near zero in a short period of time after the fluid control valve has been fully closed.

Advantageous Effects of Invention

As described, according to the present invention, as a result of forming the cutout in the part of the protruded rim that is formed by being protruded so as to surround the outflow opening of the in-valve flow path in the other end surface part and has a pressed surface, only by providing the single in-valve flow path, the fluid can be flowed from the upstream side flow path to the downstream flow path through the valve seat block. Accordingly, a new flow path configuration that eliminates the need to provide a plurality of in-valve flow paths is provided, so that miniaturization can be achieved with a function of the valve seat block being kept, and consequently the volume of the fluid control valve can be reduced. Because the volume can be reduced as described, an amount of the fluid that flows after the fluid control valve has been fully closed can be made small, and therefore a time necessary for a measured flow rate value measured by the flow rate sensor present in a subsequent stage to reach zero or near zero can be shortened. Also, the mass flow controller using the fluid control valve of the present invention enables the characteristics after the fluid control valve has been fully closed to be made substantially the same as those of a conventionally used one, and therefore replacement of an existing mass flow controller can be facilitated.

DESCRIPTION OF EMBODIMENTS

First Embodiment

A fluid control valve V and a mass flow controller 100 according to a first embodiment of the present invention are described with reference to FIGS. 1 to 4.

Figure 1:
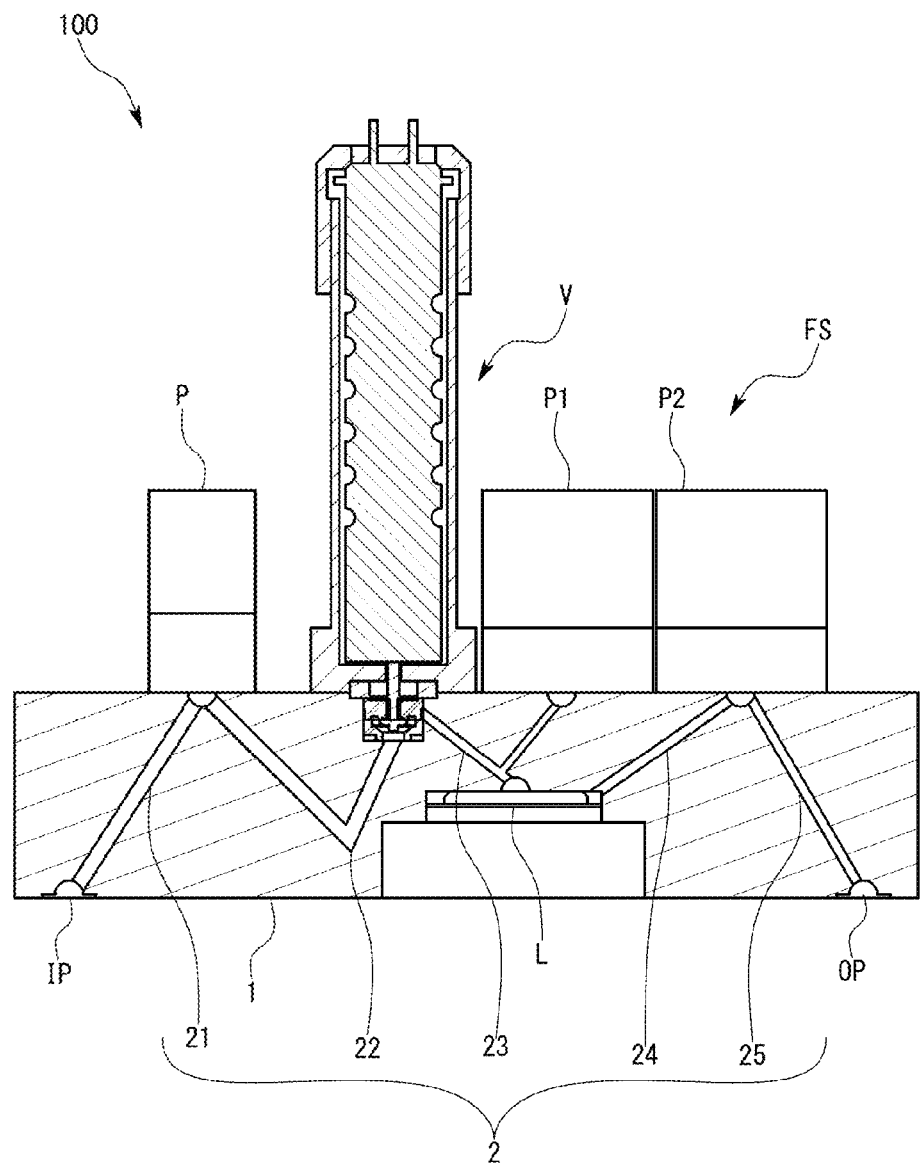
FIG. 1 is a schematic diagram illustrating a valve seat block and a mass flow controller according to a first embodiment of the present invention.

The mass flow controller 100 of the first embodiment is one that is used for a semiconductor manufacturing apparatus, and as illustrated in FIG. 1, provided with: a body 1 inside which a flow path 2 through which fluid as a measuring target flows is formed; a primary stage pressure sensor P for measuring pressure at the time when the fluid flowing through the flow path 2 flows into the body 1, or measuring pressure on an upstream side before the fluid flows into the body 1; a fluid control valve V for controlling a flow rate of the fluid flowing through the flow path 2; a flow rate sensor FS for measuring the flow rate of the fluid flowing through the flow path 2; and a control part (not illustrated) that performs feedback control of an opening level of the fluid control valve V so as to minimize a deviation between a target flow rate value and a measured flow rate value measured by the flow rate sensor FS.

Note that the primary stage pressure sensor P, the fluid control valve V, and the flow rate sensor FS are provided sequentially from the upstream side in this order. That is, the flow rate sensor FS is provided on a downstream side of the fluid control valve V.

The respective parts are described in detail.

The body 1 is one formed in a blockish shape inside which the above-described flow path 2 penetrates, and an upstream end of the flow path 2 is connected to an external inflow pipe (not illustrated) as an inlet port IP, whereas a downstream end is connected to an external outflow pipe (not illustrated) as an outlet port OP. Also, the flow path 2 formed inside the body 1 is configured to include: a first flow path 21 that connects the inlet port IP and the primary stage pressure sensor P to each other; a second flow path 22 that connects the primary stage pressure sensor P and the fluid control valve V to each other; a third flow path 23 that connects the fluid control valve V and an after-mentioned laminar flow element L to each other; a fourth flow path 24 that connects the laminar flow element L and an after-mentioned second pressure sensor P2 to each other; and a fifth flow path 25 that makes a connection from the second pressure sensor P2 to the outlet port OP. As can be seen in FIG. 1, a diameter of the third flow path 23 that makes the connection between the fluid control valve V and the laminar flow element L is formed to be thinner than at least those of the first and second flow paths 21 and 22 present on the upstream side to reduce the volume from the fluid control valve V to the laminar flow element L.

Note that in the following description, in particular, in the case of describing matters related to the fluid control valve V, the second flow path 22 and the third flow path 23 are also referred to as an upstream side flow path and a downstream side flow path, respectively.

The primary stage pressure sensor P is provided to measure an upstream side pressure change of the fluid flowing from the external inflow pipe, and for example, the control part is configured to switch a control rule for the feedback control on the basis of a measured pressure value measured by the primary stage pressure sensor P.

Various types of flow rate sensors can be used as the flow rate sensor FS; however, herein, a so-called pressure type flow rate sensor FS having good flow rate measurement accuracy and responsiveness is employed. The pressure type flow rate sensor FS is one that includes, sequentially from the upstream side, a first pressure sensor P1 that measures pressure on a downstream side of the fluid control valve V, the laminar flow element L as a fluid resistor, and the second pressure sensor P2 that measures pressure on a downstream side of the laminar flow element L. The laminar flow element L causes a pressure difference between before and after the laminar flow element L, and the flow rate is measured on the basis of the respective pressures measured by the first and second pressure sensors P1 and P2. Also, the first embodiment is adapted to, for example, arrange the laminar flow element L inside the body 1 so as to position the laminar flow element L at substantially the center in terms of a height dimension of the body 1, and make a distance from the fluid control valve V present on an upper surface side of the body 1 to the laminar flow element L short to reduce the volume of the third flow path 23 that makes the connection between the fluid control valve V and the laminar flow element L.

Figure 2:
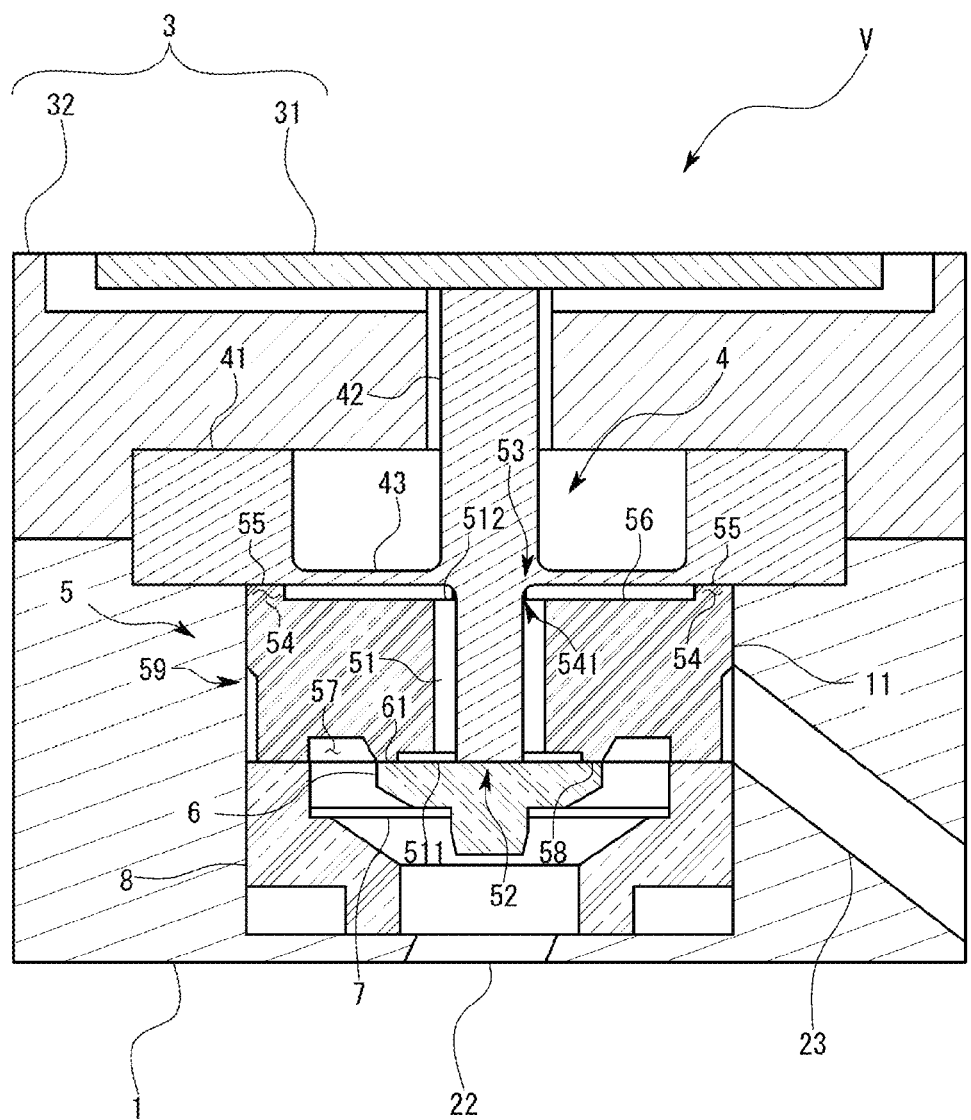
FIG. 2 is a schematic enlarged cross-sectional view in which the valve seat block constituting a fluid control valve in the first embodiment and its periphery are enlarged.

The fluid control valve V is provided so as to make a connection between the second flow path 22 as the upstream side flow path and the third flow path 23 as the downstream side flow path, and controls the flow rate of the fluid that can pass depending on a separation distance between a valve seat block 5 and a valve element member 6. That is, the fluid control valve V is one that is, as illustrated in FIGS. 1 and 2, sequentially from an upper side, provided with an actuator 3, a plunger 4, a valve seat block 5, a valve element member 6, a leaf spring 7, and a supporting member 8. More specifically, the separation distance between the valve seat block 5 and the valve element member 6 is adjusted by the movement of the actuator 3, which is transferred to the valve element member 6 through the plunger 4. Also, the leaf spring 7 is one that is, as illustrated in FIG. 2, formed with a central through-hole and a plurality of slits for making the fluid pass, and adapted to configure a normal close type that presses the valve element member 6 up from the supporting member 8 toward the actuator 3 side, and in an initial state, makes the valve element member 6 and the valve seat block 5 keep in contact with each other.

The actuator 3 is one that is provided with, for example, a piezo stack 31 formed by stacking a plurality of piezo elements. Regarding a casing member 32 containing the piezo stack 31, a flange part attached to the body 1 and a cylindrical part containing the piezo stack 31 are formed as one member. The casing is formed of a member having a low thermal expansion coefficient, such as Invar, and adapted to hardly exhibit thermal deformation. Accordingly, the casing is hardly influenced by ambient temperature, temperature of the fluid, or the like, so that regardless of temperature, a displacement amount according to voltage applied to the piezo stack 31 can be provided, and therefore hysteresis in voltage-displacement characteristics can be made small.

Figure 8A:
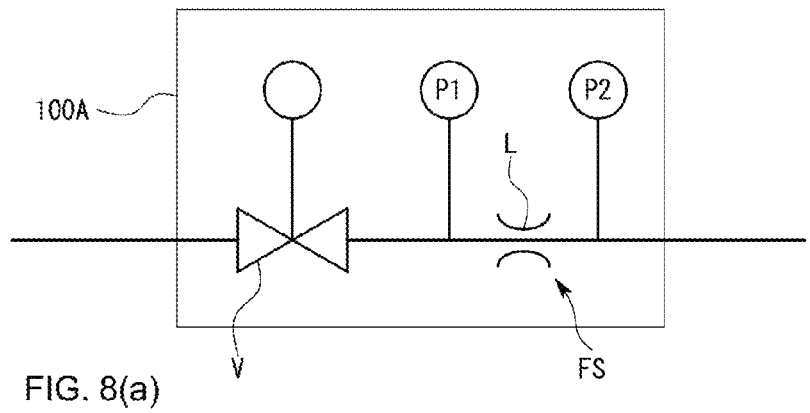
FIG. 8(a) is a schematic diagram illustrating a configuration of a conventional mass flow controller and FIG. 8(b) illustrates a shape of a valve seat block used.
Figure 8B:
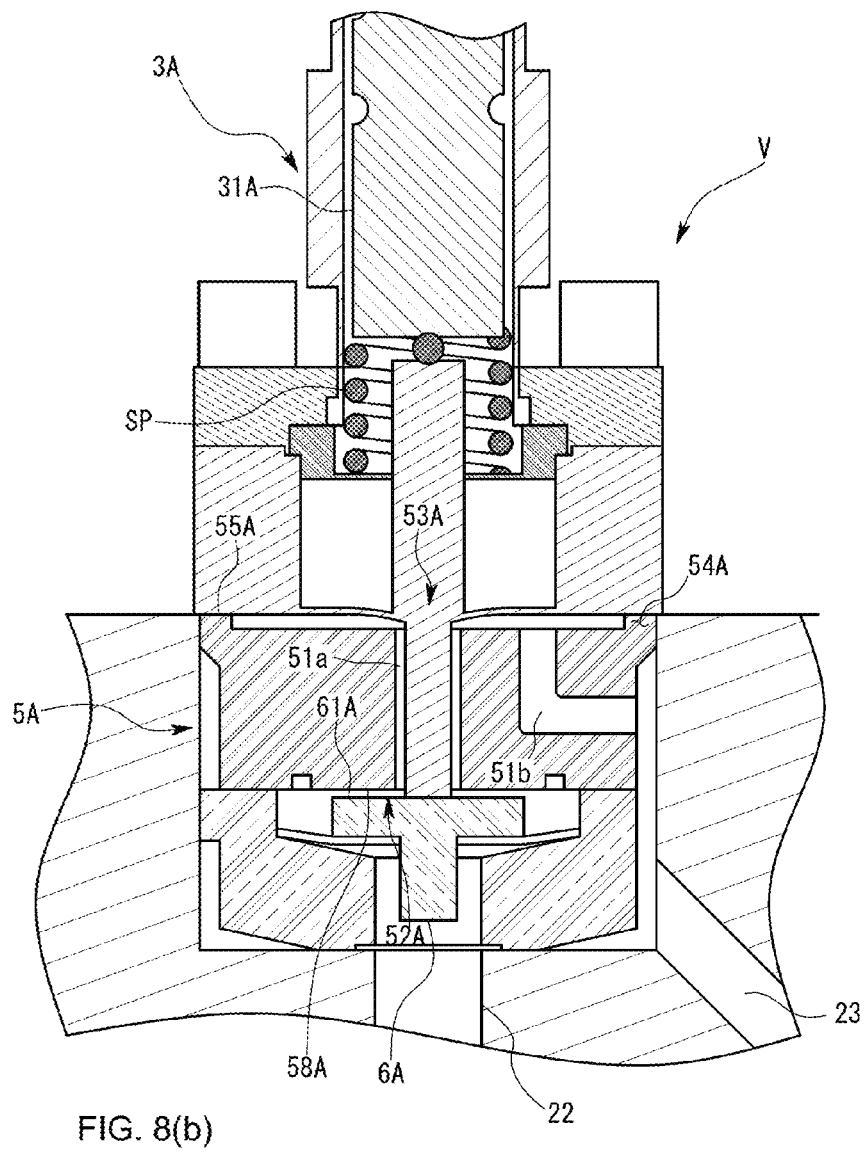
Figure 9:
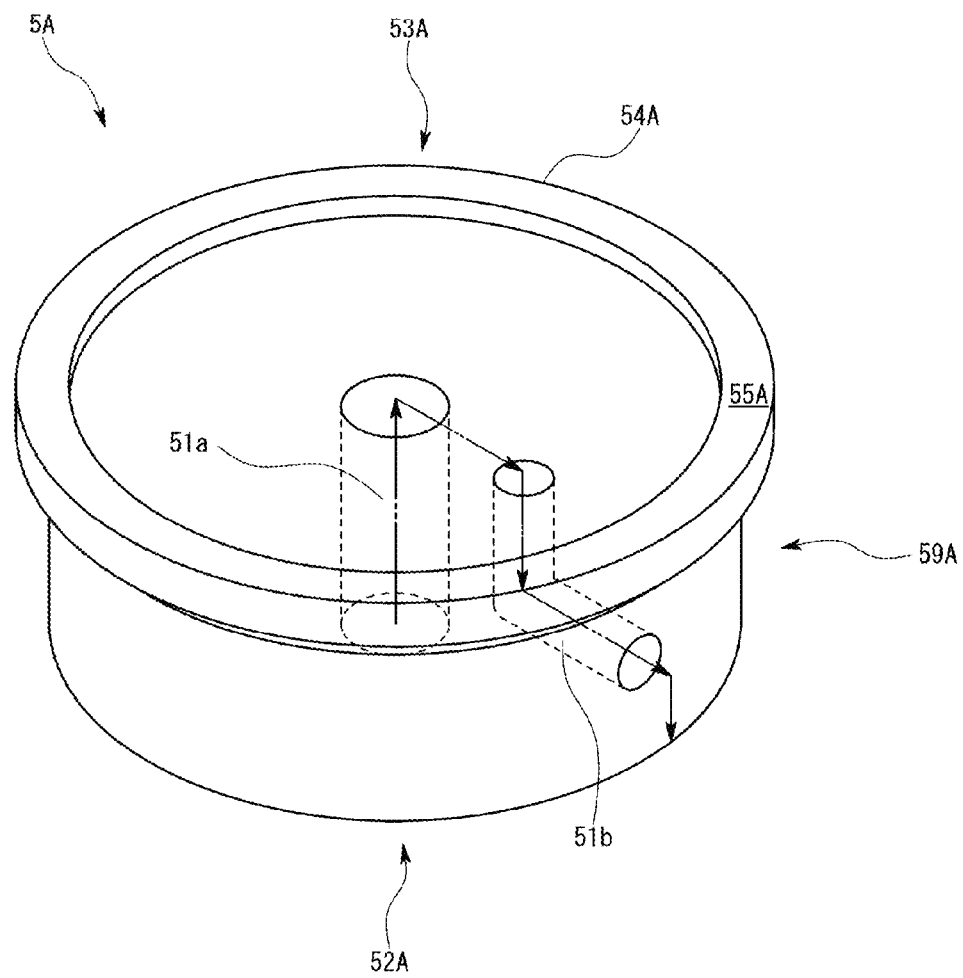
FIG. 9 is a schematic perspective view illustrating the conventional valve seat block and a flow of fluid.

The plunger 4 is configured to include: an annular part 41 that is formed in an outer circumferential part, and during assembly, presses an after-mentioned pressed surface 55 of the valve seat block 5 toward a bottom surface side as a result of fixation of the flange part of the casing member 32; a rod-like part 42 that is formed in the central part, and transfers the displacement of the piezo stack 31 to the valve element member 6; and a diaphragm part 43 that connects the annular part 41 and the rod-like part 42 to each other. The plunger 4 is formed of a material having good elasticity such as aluminum so as to, in a state where voltage is not applied to the actuator 3, generate a repulsive force in the diaphragm part 43 that restores the piezo stack 31 to the initial position. Accordingly, as opposed to the fluid control valve V in the conventional example in FIG. 8, the need for the coil spring SP or the like for restoring the piezo stack 31 to the initial position is eliminated, which contributes to simplification of the configuration of the fluid control valve V as well as miniaturization.

Figure 3A:
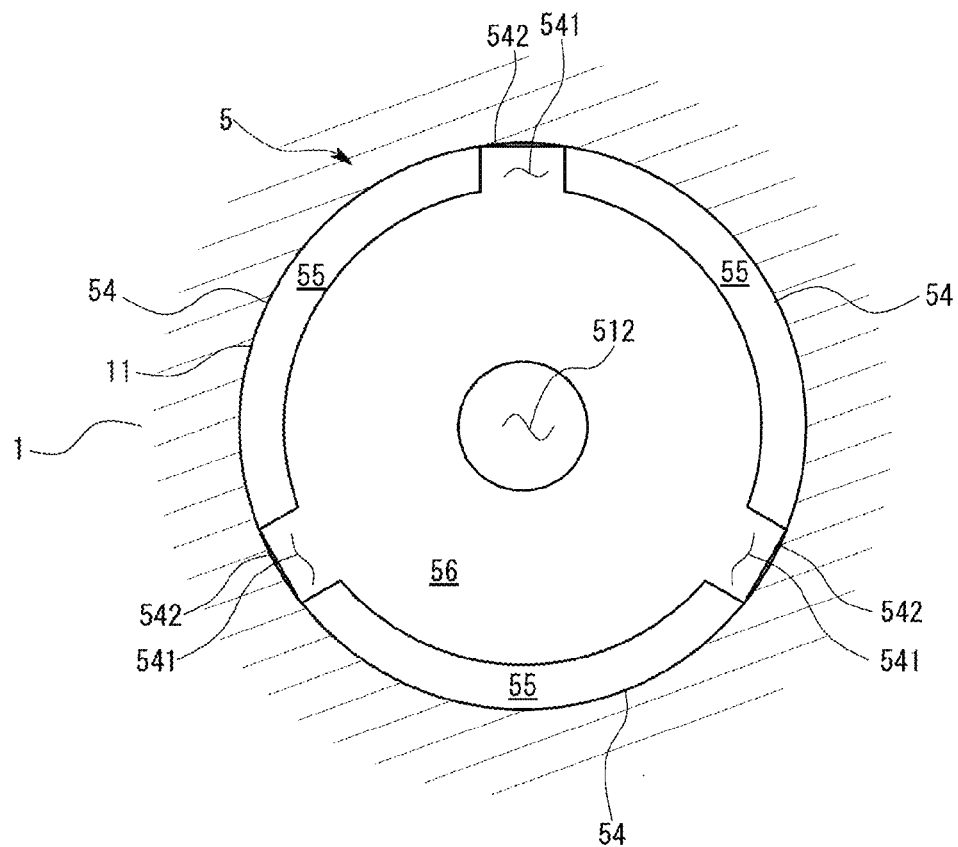
FIG. 3(a) includes a schematic top view of the valve seat block in the first embodiment, and FIG. 3(b) includes a schematic enlarged view in which a cutout and its periphery are enlarged.
Figure 3B:
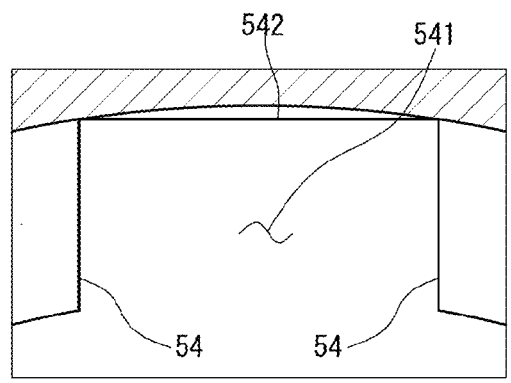
Figure 4:
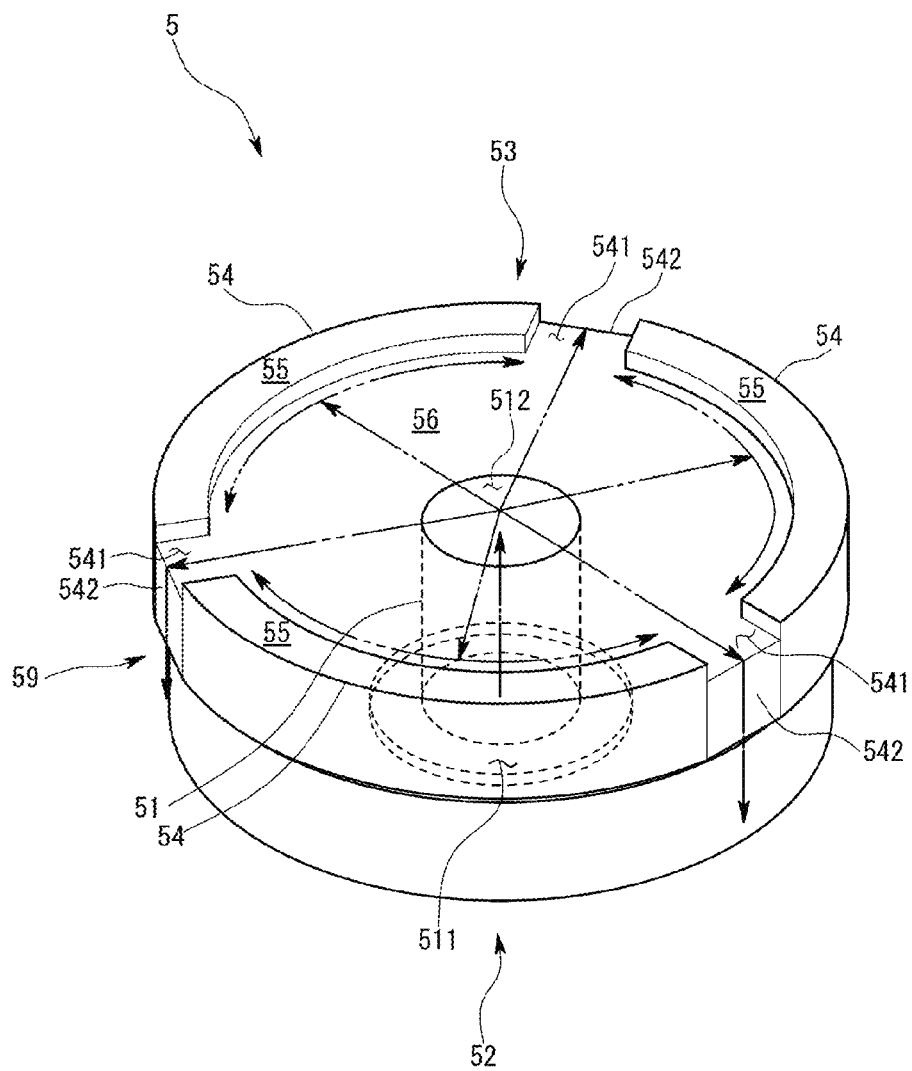
FIG. 4 is a schematic perspective view illustrating the valve seat block and a flow of fluid in the first embodiment.

The valve seat block 5 is, as illustrated in FIGS. 2 to 4, in a bottom surface part 52 corresponding to one end surface part thereof, formed with a valve seat surface 58 that is brought into contact with a seating surface 61 of the valve element member 6; formed in a substantially two-step cylindrical shape of which a minor diameter is on a bottom surface side and a major diameter is on an upper surfaced side; and in the central part, formed with an in-valve flow path 51 that extends in an axial direction.

More specifically, the valve seat block 5 is characterized by being provided with: the bottom surface part 52 that is at an upstream end of the in-valve flow path 51 and corresponds to the one end surface part formed with an inflow opening 511 connected to the upstream side flow path; an upper surface part 53 that is at a downstream end of the in-valve flow path 51 and corresponds to the other end surface part formed with an outflow opening 512 through which the fluid flowing in from the inflow opening 511 flows outside the valve seat block 5; a protruded rim 54 that is, in the upper surface part 53, formed by being protruded by a predetermined height so as to surround the outflow opening 512, and in an upper part thereof, provided with a pressed surface 55 that is, during assembly, pressed toward the bottom surface part 52 side; and cutouts 541 that are formed in parts of the protruded rim 54 so as to be communicatively connected to the downstream side flow path. Note that the bottom surface part 52 and the upper surface part 53 are not limited to being arranged only in a vertical direction, differently from the illustrated ones, and for example, in a state where the valve seat block 5 is assembled in a concave part 11 of the body 1, a side corresponding to an inner side and a side facing outward can be respectively defined as the bottom surface part 52 and the upper surface part 53.

In the upper surface part 53, the protruded rim 54 of a substantially annular shape is protruded in an outermost circumferential part in the axial direction. In other words, the upper surface part 53 is, as illustrated in a top view of FIG. 3(a), formed with: a substantially circular shaped outflow plane 56 on which the outflow opening 512 opens inward; and the pressed surface 55 of an annular beltlike shape adjacent to the outside of the outflow plane 56, and adapted to make a level of the pressed surface 55 higher than that of the outflow plane 56. The protruded rim 54 functions as a spacer for, in the case where the diaphragm part 43 of the plunger 4 is pressed and deformed by the actuator 3, preventing the diaphragm part 43 from interfering with the outflow plane 56 of the upper surface part 53. Further, the pressed surface is formed only on an upper surface of the annular protruded rim 54 that is formed in the outermost circumference part in the upper surface part 53, and therefore at the time of being pressed, makes deformation of the valve seat block 5 less likely to arrive at the valve seat surface 58 formed in the bottom surface part 52, so that flatness of the valve seat surface 58 can be maintained. Also, in another expression, the pressed surface 55 of the protruded rim 54 is configured to be pressed during assembly by the annular part 41 of the plunger 4 present on the upper side, and also on the basis of a resultant counterforce, press the annular part 41 of the plunger 4.

The protruded rim 54 is, as illustrated in FIG. 4, formed with the three cutouts 541 at regular intervals, i.e., at every 120 degrees in a circumferential direction. Also, as illustrated in an enlarged view of FIG. 3(b), in the vicinity of each of the cutouts 541, a cutoff part 542 formed by cutting off the vicinity of the cutout 541 part in the axial direction on the upper surface part 53 side of an outer circumferential surface 59 is formed.

In the bottom surface part 52, the valve seat surface 58 is formed so as to surround the inflow opening 511 in the bottom surface part 52, and on an outer side of the valve seat surface 58, an annular concave groove 57 having a smaller outside diameter size than the protruded rim 54 is formed so as to surround the inflow opening 511. Because of the presence of the concave groove 57, even in the case where the pressed surface 55 is pressed during assembly, the deformation of the valve seat block 5 on the bottom surface part 52 side is limited to a substantially outer circumferential side, and therefore the flatness of the valve seat surface 58 can be maintained. Accordingly, a preferable degree of contact with the seating surface 61 of the valve element member 6 can be constantly maintained, and therefore a sealing function of a valve can be fulfilled.

Further, the valve seat block 5 is assembled by being fitted into the concave part 11 of a cylindrical shape provided in the body 1. The concave part 11 is arranged so as to separate the second and third flow paths 22 and 23 of the body 1 from each other, and the second flow path 22 as the upstream side flow path is adapted to open at the bottom surface central part of the concave part 11, whereas the third flow path 23 as the downstream side flow path is adapted to open at a position that is at the central part of the outer circumferential surface 59 of the concave part 11 and corresponds to a minor diameter part of the valve seat block 5.

Still further, in the state where the valve seat block 5 is fitted into the concave part 11, a part other than the cutoff parts 542 in a major diameter part on the upper surface part 53 side of the valve seat member is adapted to be fitted on an inner circumferential surface of the concave part 11 without space, whereas the minor diameter part on the bottom surface part 52 side of the valve seat block 5 is adapted to be formed with a space between the minor diameter part and the inner circumferential surface of the concave part 11.

Accordingly, as illustrated in FIG. 4, the fluid flowing from the upstream side flow path into the in-valve flow path 51 moves toward the upper surface part 53 of the valve seat block 5 in the axial direction, and when flowing out of the outflow opening 512, flows in radial directions to arrive at the cutouts 541 formed in the protruded rim 54. Then, the fluid having arrived at the cutout 541 parts passes between the cutoff parts 542 adjacent to the cutouts 541 and the inner circumferential surface of the concave part 11, moves along the outer circumferential surface 59 of the valve seat block 5, and arrives at the space between the minor diameter part of the valve seat block 5 and the inner circumferential surface of the concave part 11. Finally, the fluid flows to the downstream side flow path that opens to the space.

That is, the present embodiment is adapted such that the fluid rises out from the in-valve flow path 51 inside the valve seat block 5 to the upper surface part 53, then moves along the outer circumferential surface 59, and flows to the downstream side flow path.

As described, according to the valve seat block 5 of the first embodiment, the number of in-valve flow paths 51, which has conventionally required two, can be reduced to one, and a function of the fluid control valve V can be fulfilled, so that it is only necessary to form the single in-valve flow path 51, and therefore miniaturization is facilitated.

Accordingly, because volume of the fluid control valve V can also be made small, the volume from the fluid control valve V to the laminar flow element L can be made much smaller than before, and therefore an amount of the fluid that flows to the flow rate sensor FS after the fluid control valve V has been fully closed can be reduced.

For this reason, even in the case of the mass flow controller 100 having the configuration in which the flow rate sensor FS is provided on the downstream side of the fluid control valve V, a measured flow rate value that is measured by the flow rate sensor FS after the fluid control valve V has been fully closed can reach zero or a value near zero in a short period of time.

That is, characteristics very close to characteristics of an existing mass flow controller, which is used in a semiconductor manufacturing process, at the time of fully closing a fluid control valve can be achieved, and therefore the existing mass flow controller can be easily replaced by the mass flow controller 100 of the first embodiment.

Also, the three cutouts 541 that are formed in place of forming the second in-valve flow path 51 are formed so as to be rotationally symmetric with respect to the protruded rim 54 formed with the pressed surface 55, so that the deformation of the valve seat block 5 at the time of pressing the pressed surface 55 can be made uniform, and therefore an adverse influence on the flatness of the valve seat surface 58 or the like can be prevented.

Accordingly, basic functions of the fluid control valve V, such as sealing performance, can be prevented from being frustrated by a miniaturization-induced change in configuration of the flow path 2 in the valve seat block 5.

Second Embodiment

Next, a second embodiment is described with reference to FIGS. 5 and 6. Note that members corresponding to those in the first embodiment are affixed with the same letters or numerals.

A mass flow controller 100 of the second embodiment is, as compared with that of the first embodiment, different in configuration of a fluid control valve V, in particular, configuration of a valve seat block 5.

Figure 5:
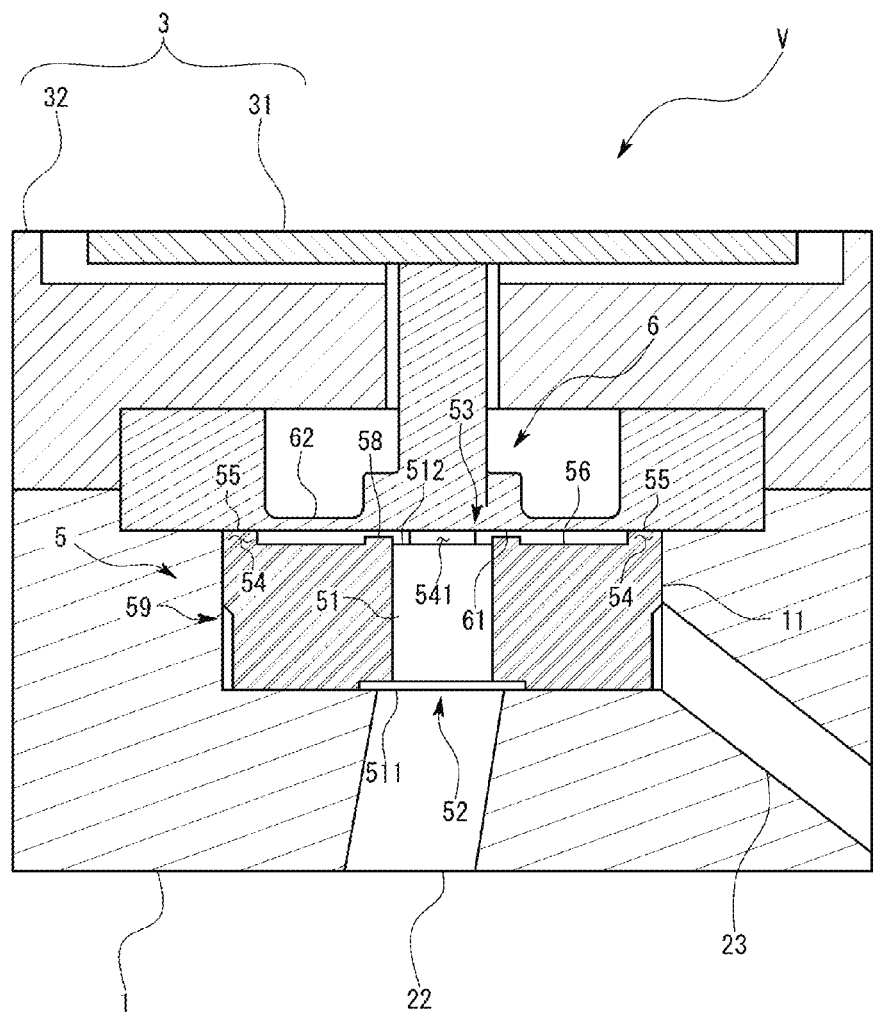
FIG. 5 is a schematic enlarged cross-sectional view illustrating a valve seat block constituting a fluid control valve according to a second embodiment of the present invention.

More specifically, the fluid control valve V of the second embodiment is configured to be of a normal open type, and as illustrated in FIG. 5, from an upper side, includes an actuator 3, valve element member 6, and valve seat block 5.

The valve element member 6 is one that has a shape corresponding to the plunger 4 in the first embodiment, and also has diaphragm structure of which a bottom surface is formed flush and thereby made to serve as a seating surface 61. The valve element member 6 is adapted to be able to adjust a separation distance between the seating surface 61 and a valve seat surface 58 in such a way that voltage is applied to the actuator 3 to give rise to deformation, which causes the central part to be pressed, and thereby a diaphragm part 62 is elastically deformed toward the valve seat block 5 side. Also, in the case where voltage is not applied to the actuator 3, as illustrated in FIG. 5, the seating surface 61 and the valve seat surface 58 are separate from each other, and therefore in an initial state, an open state is maintained.

Figure 6:
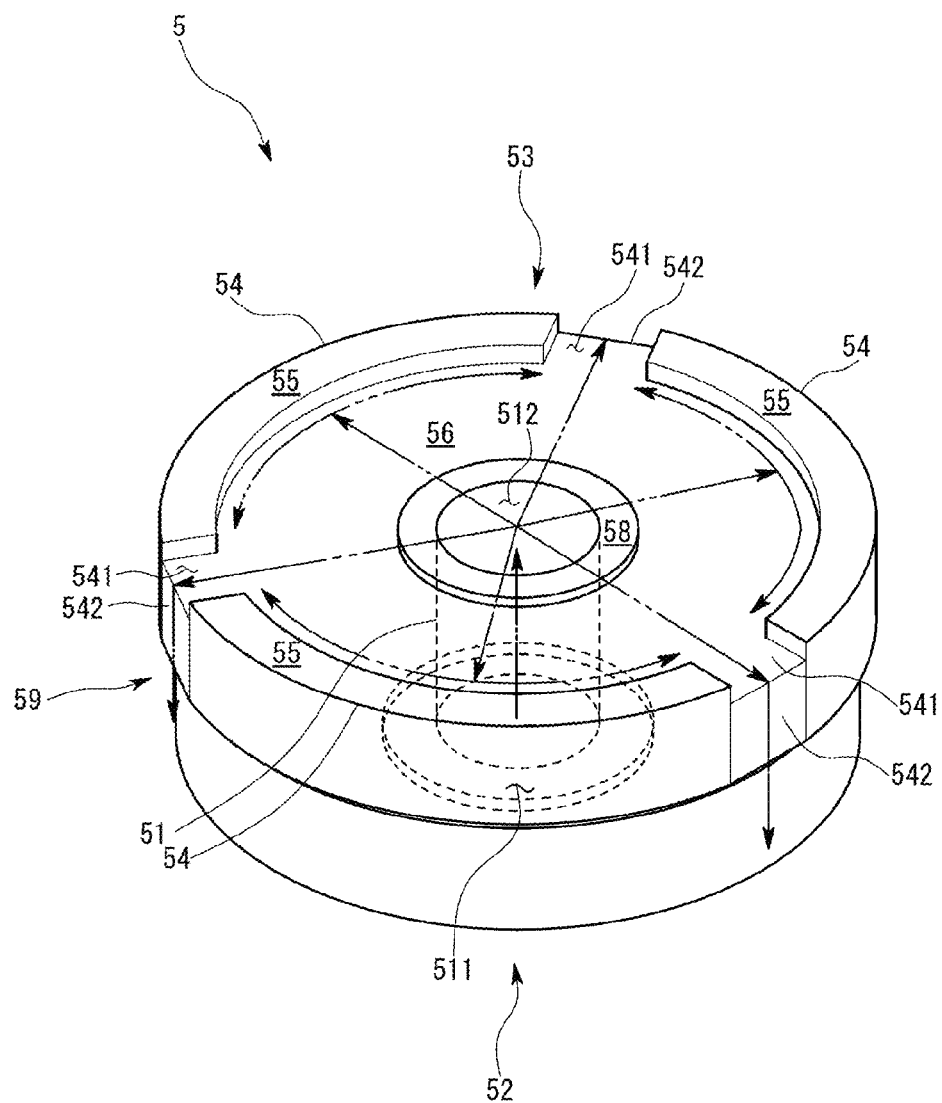
FIG. 6 is a schematic perspective view illustrating the valve seat block and a flow of fluid in the second embodiment.

The valve seat block 5 is, as illustrated in FIGS. 5 and 6, formed with the valve seat surface 58 that, in an upper surface part 53, surrounds an outflow opening 512 on an inner side of a protruded rim 54, and is also protruded to a level lower than a level of a pressed surface 55.

Even with such a valve seat block 5, substantially the same fluid flow as that in the first embodiment as illustrated in FIG.

6 can be formed, and therefore substantially the same effect as that of the first embodiment can be obtained.

That is, the valve seat block 5 of the present invention can be used for any of the normal close type and normal open type fluid control valves V.

Other embodiments are described.

Figure 7A:
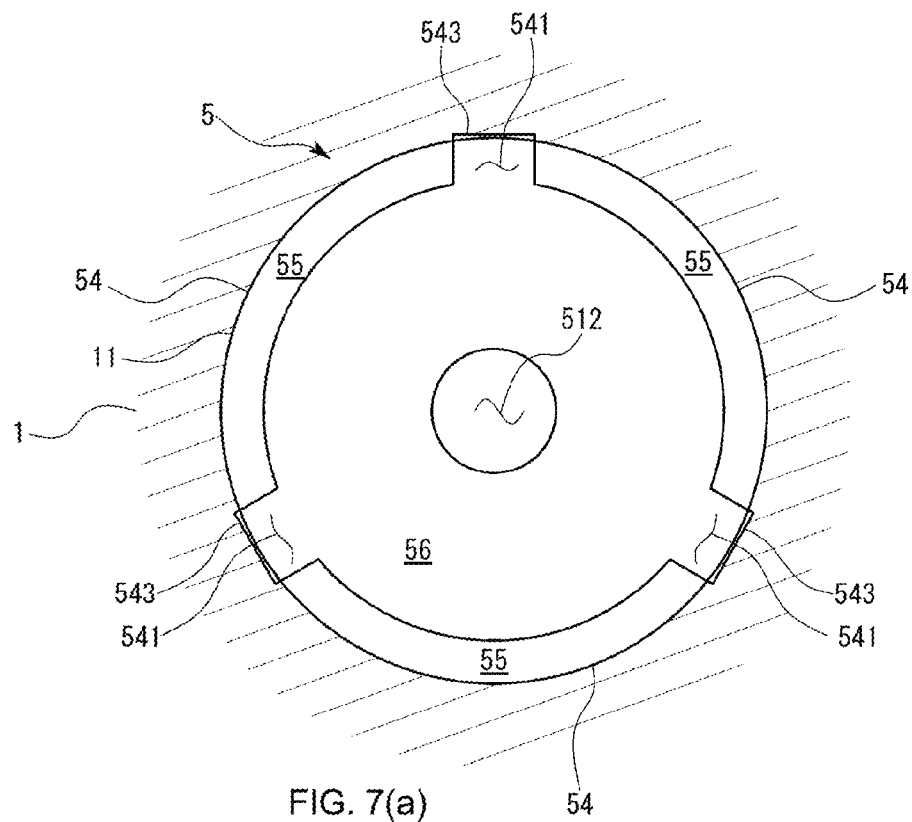
FIG. 7(a) is a schematic diagram illustrating configurations of a valve seat block and FIG. 7(b) illustrates a concave part in another embodiment.
Figure 7B:
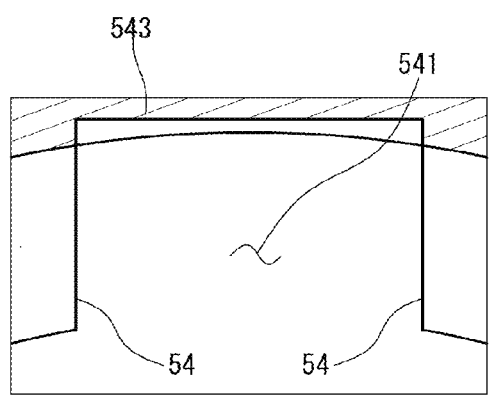

In any of the above-described embodiments, the valve seat block 5 is formed with the cutoff parts 542 on the outer circumferential surface 59 near the cutouts 541 to, between the valve seat block 5 and the concave part 11, form the spaces through which the fluid passes; however, as illustrated in FIGS. 7(a) and (b), the present invention may be adapted such that the outer circumferential surface on the upper surface part 53 side of the valve seat block is formed as a completely cylindrical side surface, and by designing a shape of the concave part 11 side, the spaces are formed. That is, as illustrated in FIGS. 7(a) and (b), the present invention may be adapted to, on the inner circumferential surface of the concave part 11, form vertical grooves 543 that protrude outward in radial directions and extend in the axial direction, and form the spaces between the concave part 11 and the outer circumferential surface 59 of the valve seat block 5. In addition, as illustrated in FIG. 7, in the case of forming the vertical grooves 543 in order to form the spaces between the outer circumferential surface 59 of the valve seat block 5 and the inner circumferential surface of the concave part 11, it is necessary to perform positioning so as to align the cutouts 541 with corresponding vertical grooves 543 in position during assembly. On the other hand, as in any of the above-described embodiments, in the case where the valve seat block 5 has the cutoff parts 542 on the outer circumferential surface 59 near the cutouts 541, and the concave part 11 is formed in the cylindrical shape, the positioning as described above is not required, and therefore assembling is very easy.

Further, any of the above-described embodiments is configured such that, in the fluid control valve, the fluid flows in the order of the upstream side flow path, in-valve flow path, upper surface part, cutouts, outer circumferential surface, and downstream side flow path; however, even in the case of reversing the flow of the fluid, miniaturization can be achieved in a similar manner. That is, the present invention may be a fluid control valve configured to include a valve seat block and a valve element member, wherein the valve seat block is provided with an in-valve flow path that is formed inside of the valve seat block, and a valve seat surface that is brought into contact with or separated from a seating surface of the valve element member, and the valve seat block is further provided with; one end surface part that is at a downstream end of the in-valve flow path and formed with an outflow opening connected to a downstream side flow path; the other end surface part that is at an upstream end of the in-valve flow path and formed with an inflow opening into which fluid flows from outside the valve seat block; a protruded rim that is protruded by a predetermined height so as to surround the inflow opening in the other end surface part, and is provided with a pressed surface that is pressed toward the one end surface part side during assembly; and a cutout that is formed in a part of the protruded rim so as to be communicatively connected to an upstream side flow path.

In any of the above-described embodiments, in the valve seat block, the protruded rim is formed by being protruded from the upper surface part, and molded as an integrated object; however, for example, only the protruded part may be configured as another member. Even with such a protruded rim part, in the case where the valve seat block is assembled by being pressed toward the bottom surface part side, a function as a spacer, and an effect of preventing the deformation of the valve seat block due to a pressing force on the pressed surface from arriving at the valve seat surface, and maintaining flatness can be obtained. In addition, as described, in the case where only the protruded rim is configured as a separate body, when in order to form the deformation of the valve seat block during assembly in a symmetric shape, attempting to arrange the protruded rim and the cutouts in the upper surface part at the time of assembling as illustrated in FIGS. 3(a) and (b) or FIG. 7, it is necessary to perform strict positioning or use some sort of jig. On the other hand, as in any of the above-described embodiments, in the case of the valve seat block in which the protruded rim is also integrated with a main body part, without particularly performing positioning, the protruded rim and cutouts in the upper surface part can be positioned as desired, and therefore the deformation of the valve seat block can be performed in a desirable symmetric shape. Accordingly, even after miniaturization, flatness of the valve seat surface can be easily provided to easily obtain the sealing function or the like of the flow rate control valve.

In each of the above-described embodiments, the number of cutouts formed in the protruded rim is three; however, the number of cutouts may be one or another number. It is only necessary to set the number of cutouts in consideration of a balance between the cutouts and the pressed surface so as to be able to keep a function of the pressed surface.

Also, depending on a position of the downstream side flow path opening to the concave part, the cutoff parts are not necessarily provided. For example, it is only necessary to open the downstream side flow path to the concave part at a position corresponding to any of the cutouts in an assembled state.

In any of the above-described embodiments, a shape of the valve seat block is the substantially cylindrical shape; however, the valve seat block may be formed in another shape such as a quadrangular prism.

In any of the above-described embodiments, the mass flow controller that is provided with the pressure type flow rate sensor on the downstream side of the fluid control valve is described; however, even in the case where the flow rate sensor is a thermal type flow rate sensor, the effect of the present invention can be obtained.

Also, in addition to using the valve seat block of the present invention to make the characteristics of a measured flow rate value after fully closing the fluid control valve meet desired characteristics, the valve seat block of the present invention may also be used in the case of desiring to miniaturize a single body of the fluid control valve. For example, the valve seat block of the present invention may be used in order to miniaturize the whole of a mass flow controller that is provided with a flow rate sensor on an upstream side of a fluid control valve. In short, the valve seat block of the present invention can also be used for the purpose of miniaturization along with realizing a function of the fluid control valve.

In any of the above-described embodiments, the fluid control valve is used to control the flow rate of the fluid; however, the fluid control valve may be used to control pressure of the fluid. As the fluid to be controlled, any of liquid and gas is possible.

In addition, various modifications and combinations of the embodiments may be made unless contrary to the scope of the present invention.

REFERENCE CHARACTER LIST

100: Mass flow controller
5: Valve seat block
51: In-valve flow path

511: Inflow opening
512: Outflow opening
52: Bottom surface part
53: Upper surface part
54: Protruded rim
541: Cutout
542: Cutoff part
55: Pressed surface
57: Concave groove
58: Valve seat surface
59: Outer circumferential surface
6: Valve element member
61: Seating surface
V: Fluid control valve

The invention claimed is:

1. A fluid control valve configured to include a valve seat block and a valve element member, the valve seat block comprising: an in-valve flow path that is formed inside of the valve seat block; and a valve seat surface that is brought into contact with or separated from a seating surface of the valve element member, wherein
the valve seat block further comprises:
one end surface part that is at an upstream end of the in-valve flow path and on an upstream side of the valve seat block, and formed with an inflow opening connected to an upstream side flow path;
another end surface part that is at a downstream end of the in-valve flow path and on a downstream side of the valve seat block, and formed with an outflow opening through which fluid flowing in from the inflow opening flows outside the valve seat block;
a protruded rim that is protruded by a predetermined height so as to surround the outflow opening in the other end surface part on the downstream side of the valve seat block, and comprises a pressed surface that is pressed toward a one end surface part side during assembly; and
a cutout that is formed in a part of the protruded rim so as to be communicatively connected to a downstream side flow path, wherein
the valve element member is arranged outside of the in-valve flow path, and the valve seat surface of the valve seat block, facing the seating surface of the valve element member, is on the upstream side of the valve seat block opposite from the downstream side of the valve seat block.

2. The fluid control valve according to claim 1, configured such that
the fluid having flowed out from the outflow opening passes through the cutout, moves along an outer circumferential surface of the valve seat block, and flows to the downstream side flow path.

3. The fluid control valve according to claim 1, wherein:
the protruded rim is formed in a substantially annular shape; and
three cutouts are formed in a circumferential direction at regular intervals.

4. The fluid control valve according to claim 1, wherein:
an outer circumferential surface of the valve seat block is formed as a side surface of a substantially two-step cylindrical shape of which a major diameter is on the other end surface part side and a minor diameter is on the one end surface part side; and
on the other end surface part side of the outer circumferential surface of the valve seat block, a cutoff part is formed by cutting off a vicinity of the cutout in an axial direction.

5. The fluid control valve according to claim 1, wherein in the one end surface part, the valve seat surface is formed so as to surround the inflow opening.

6. The fluid control valve according to claim 5, wherein in the one end surface part, an annular concave groove is formed so as to surround the inflow opening, the annular concave groove having a smaller outside diameter size than an outside diameter size of the protruded rim.

7. The fluid control valve according to claim 1, wherein in the other end surface part, the valve seat surface is formed on an inner side of the protruded rim that surrounds the outflow opening and the valve seat surface is protruded to a lower level than a level of the pressed surface.

8. A mass flow controller comprising:
the fluid control valve according to claim 1; and
a flow rate sensor that is provided on a downstream side of the fluid control valve.

9. A fluid control valve configured to include a valve seat block and a valve element member, the valve seat block comprising: an in-valve flow path that is formed inside; and a valve seat surface that is brought into contact with or separated from a seating surface of the valve element member, wherein
the valve seat block further comprises:
one end surface part that is at a downstream end of the in-valve flow path and on a downstream side of the valve seat block, and formed with an outflow opening connected to a downstream side flow path;
another end surface part that is at an upstream end of the in-valve flow path and on an upstream side of the valve seat block, and formed with an inflow opening through which fluid flows in from outside the valve seat block;
a protruded rim that is protruded by a predetermined height so as to surround the inflow opening in the other end surface part on the upstream side of the valve seat block, and comprises a pressed surface that is pressed toward a one end surface part side during assembly; and
a cutout that is formed in a part of the protruded rim so as to be communicatively connected to an upstream side flow path, wherein
the valve element member is arranged outside of the in-valve flow path, and
the valve seat surface of the valve seat block, facing the seating surface of the valve element member, is on the downstream side of the valve seat block opposite from the upstream side of the valve seat block.

10. A fluid control valve configured to include a valve seat block and a valve element member, the valve seat block comprising: an in-valve flow path that is formed inside; and a valve seat surface that is brought into contact with or separated from a seating surface of the valve element member, wherein
the valve seat block comprises:
one end surface part that is at an upstream end of the in-valve flow path and formed with an inflow opening connected to an upstream side flow path;
another end surface part that is at a downstream end of the in-valve flow path and formed with an outflow opening through which fluid flowing in from the inflow opening flows outside the valve seat block;
a protruded rim that is protruded by a predetermined height so as to surround the outflow opening in the other end surface part, and comprises a pressed surface that is pressed toward a one end surface part side at a time of assembling; and a cutout that is formed in a part of the protruded rim so as to be communicatively connected to a downstream side flow path, wherein an outer circumferential surface of the valve seat block is formed as a side surface of a substantially two-step cylindrical shape of which a major diameter is on the other end surface part side and a minor diameter is on the one end surface part side; and on the other end surface part side of the outer circumferential surface of the valve seat block, a cutoff part formed by cutting off a vicinity of the cutout in an axial direction is formed.

11. A fluid control valve configured to include a valve seat block and a valve element member, the valve seat block comprising: an in-valve flow path that is formed inside; and a valve seat surface that is brought into contact with or separated from a seating surface of the valve element member, wherein the valve seat block comprises:

one end surface part that is at an upstream end of the in-valve flow path and formed with an inflow opening connected to an upstream side flow path;

another end surface part that is at a downstream end of the in-valve flow path and formed with an outflow opening through which fluid flowing in from the inflow opening flows outside the valve seat block;

a protruded rim that is protruded by a predetermined height so as to surround the outflow opening in the other end surface part, and comprises a pressed surface that is pressed toward a one end surface part side during assembly; and a cutout that is formed in a part of the protruded rim so as to be communicatively connected to a downstream side flow path, wherein an outer circumferential surface of the valve seat block is formed as a side surface of a substantially two-step cylindrical shape of which a major diameter is on the other end surface part side and a minor diameter is on the one end surface part side; and on an inner circumferential surface of a concave part that contains the valve seat block, a groove is formed in a vicinity of the cutout to extend in an axial direction.

* * * * *